United States Patent [19]
Jones

[11] Patent Number: 5,331,361
[45] Date of Patent: Jul. 19, 1994

[54] SYNCHRONIZED FILTER DEVICE

[76] Inventor: Aaron Jones, 3 Vaquero Rd., Santa Fe, N. Mex. 87505

[21] Appl. No.: 914,859

[22] Filed: Jul. 15, 1992

[51] Int. Cl.$^5$ .................. G03B 11/00; G03B 15/03; G03B 17/38
[52] U.S. Cl. ................... 354/132; 354/133; 354/149.1; 354/267.1; 354/290; 354/295; 362/17; 362/18
[58] Field of Search ............. 354/129, 132, 133, 140, 354/149.1, 267.1, 288, 295, 290, 413; 362/18, 17, 32; 352/45, 49; 358/42, 296

[56] References Cited

U.S. PATENT DOCUMENTS

| | | | |
|---|---|---|---|
| 2,010,307 | 8/1935 | Leishman | 358/42 |
| 2,315,284 | 3/1943 | Thompson | 354/295 |
| 2,337,327 | 12/1943 | Haskin | 352/88 X |
| 2,580,422 | 1/1952 | Gunn | 352/49 |
| 3,410,203 | 11/1968 | Fischbeck | 358/296 X |
| 3,515,492 | 6/1970 | Butterfield | 352/45 X |
| 4,310,228 | 1/1982 | Terada | 354/413 |
| 4,385,344 | 5/1983 | Gonser | 362/32 |
| 4,417,791 | 11/1983 | Erland et al. | 352/45 |
| 4,530,036 | 7/1985 | Conti | 362/32 |
| 4,553,193 | 11/1985 | Evans | 362/18 X |
| 4,557,574 | 12/1985 | Kohno et al. | 354/288 |
| 4,754,297 | 6/1988 | Edwards | 352/45 X |
| 4,755,912 | 7/1988 | Evans | 362/18 X |
| 4,835,563 | 5/1989 | Larish | 354/290 X |
| 4,876,563 | 10/1989 | Ishida et al. | 354/288 X |
| 5,029,309 | 7/1991 | Jones | 354/129 |
| 5,034,761 | 7/1991 | Jones | 354/129 |

Primary Examiner—Michael L. Gellner
Assistant Examiner—J. K. Han
Attorney, Agent, or Firm—Robert D. Varitz

[57] ABSTRACT

A synchronized filter mechanism is intended for a use with a camera, which has a flash synchronizer, and plural stroboscopic light sources. The filter mechanism includes a filter holder, which holds plural filters in optical alignment with the camera, a subject and the light sources. The filters may be selected to have differing optical properties. A drive mechanism is provided for driving the filter holder. A control circuit is provided for controlling the drive motor and for triggering the light sources at predetermined times relative the optical alignment of the camera, the filters and the light sources.

11 Claims, 4 Drawing Sheets

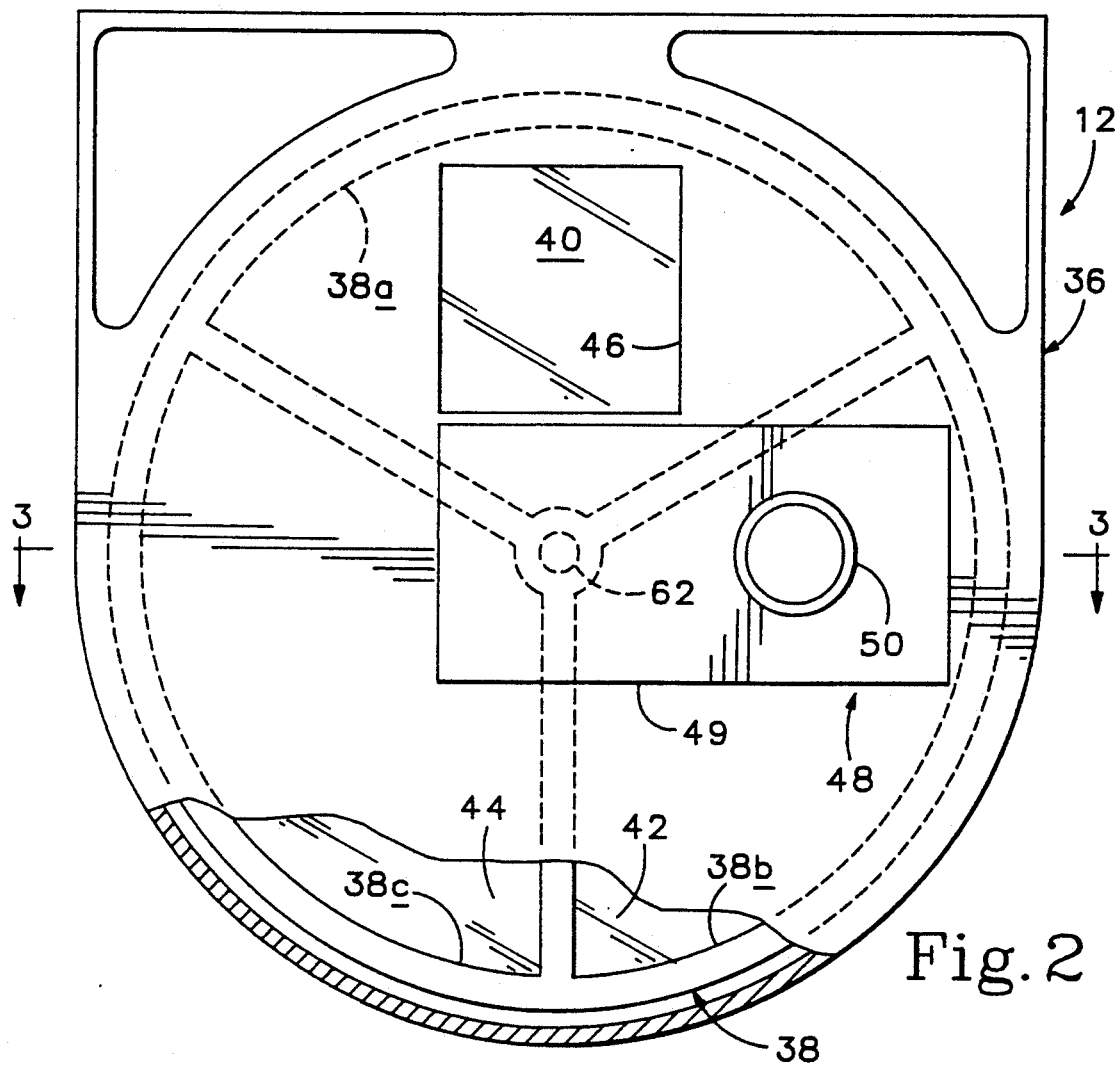
Fig. 2
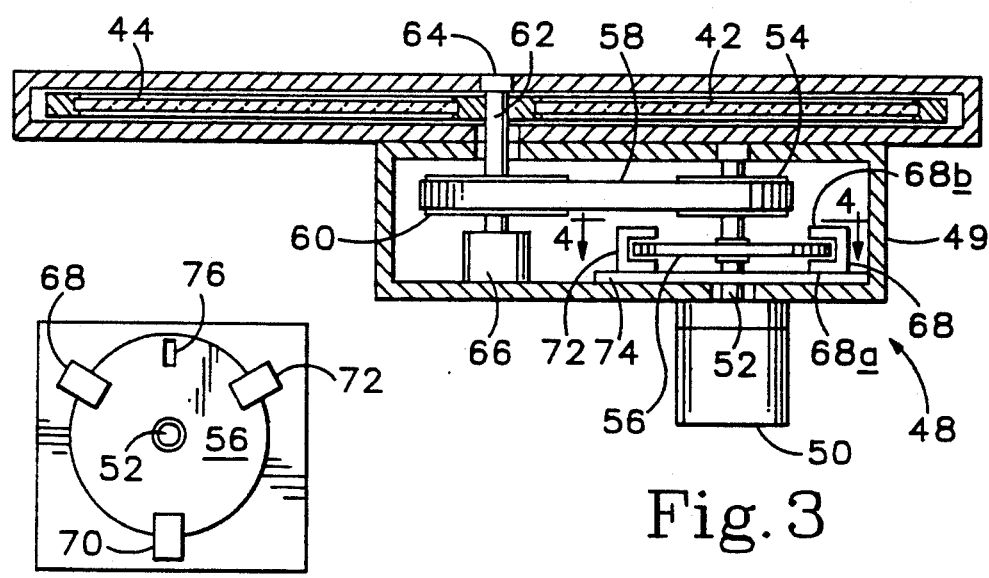
Fig. 3
Fig. 4

SYNCHRONIZED FILTER DEVICE

BACKGROUND AND SUMMARY OF THE INVENTION

This invention relates to photographic lighting equipment, and specifically to a filter mechanism which is synchronized with an array of stroboscopic light sources to illuminate and filter a subject having a photograph made thereof.

A wide variety of filters are used to enhance photographs. Likewise, special lighting may be used to enhance the subject of a photograph. Two devices to assist in such photographic enhancement are disclosed in my prior issued patents, U.S. Pat. No. 5,029,309, Jul. 2, 1991 for PHOTOGRAPHIC EXPOSURE CONTROL APPARATUS AND METHOD, and U.S. Pat. No. 5,034,761, Jul. 23, 1991, for PHOTOGRAPHIC EXPOSURE CONTROL APPARATUS HAVING REMOTE FILTER HOLDER MECHANISM. The apparatus and methods disclosed in the aforementioned patents are particularly well suited for illuminating still-life subjects and for providing special photographic effects with those subjects.

However, the devices and methods disclosed in the aforementioned patents allow a photographer to illuminate specific parts of a subject, with or without the insertion of a filtering medium in the sight line between the camera and subject, but assume that the subject will remain stationary. In the case of live subjects, it is necessary to provide sufficient lighting to allow the use of shutter speeds which are of reasonably short duration. It is still desirable in some instances, to provide multiple filtering of various parts of the overall subject, even with a live subject.

SUMMARY OF THE INVENTION

It is an object of the invention to provide a filter mechanism which allows the imposition of filters having different optical characteristics between a subject and a camera, wherein the filters are synchronized with plural light sources.

Another object of the invention is to provide a filter mechanism which allows a variety of filters quickly to be interposed between a live subject and a camera.

A further object of the invention is to provide a filter mechanism which is operable to trigger, sequentially, plural stroboscopic flash units.

Yet another object of the invention is to provide a filter mechanism which allows a user to insert various filters into a filter holder thereof.

The synchronized filter mechanism of the invention is intended for a use with a camera, which has a flash synchronizer, and plural stroboscopic light sources. The filter mechanism includes a filter holder, which holds plural filters in optical alignment with the camera, a subject and the light sources. The filters are located in the filter holders, wherein the filters have differing optical properties. A drive motor is provided for driving the filter holder. A control circuit is provided for controlling the drive motor and for triggering the light sources at predetermined times relative the optical alignment of the camera, the filters and the light sources.

These and other objects of the invention will become more fully apparent as the description which follows is read in conjunction with the drawings.

BRIEF DESCRIPTION OF THE DRAWINGS

FIG. 2 is a front plan elevation of the filter holder of the invention.

FIG. 3 is a top sectional view of the filter holder of FIG. 2.

FIG. 4 is a front elevation of an optical encoder.

DETAILED DESCRIPTION OF THE PREFERRED EMBODIMENT

Figure 1:
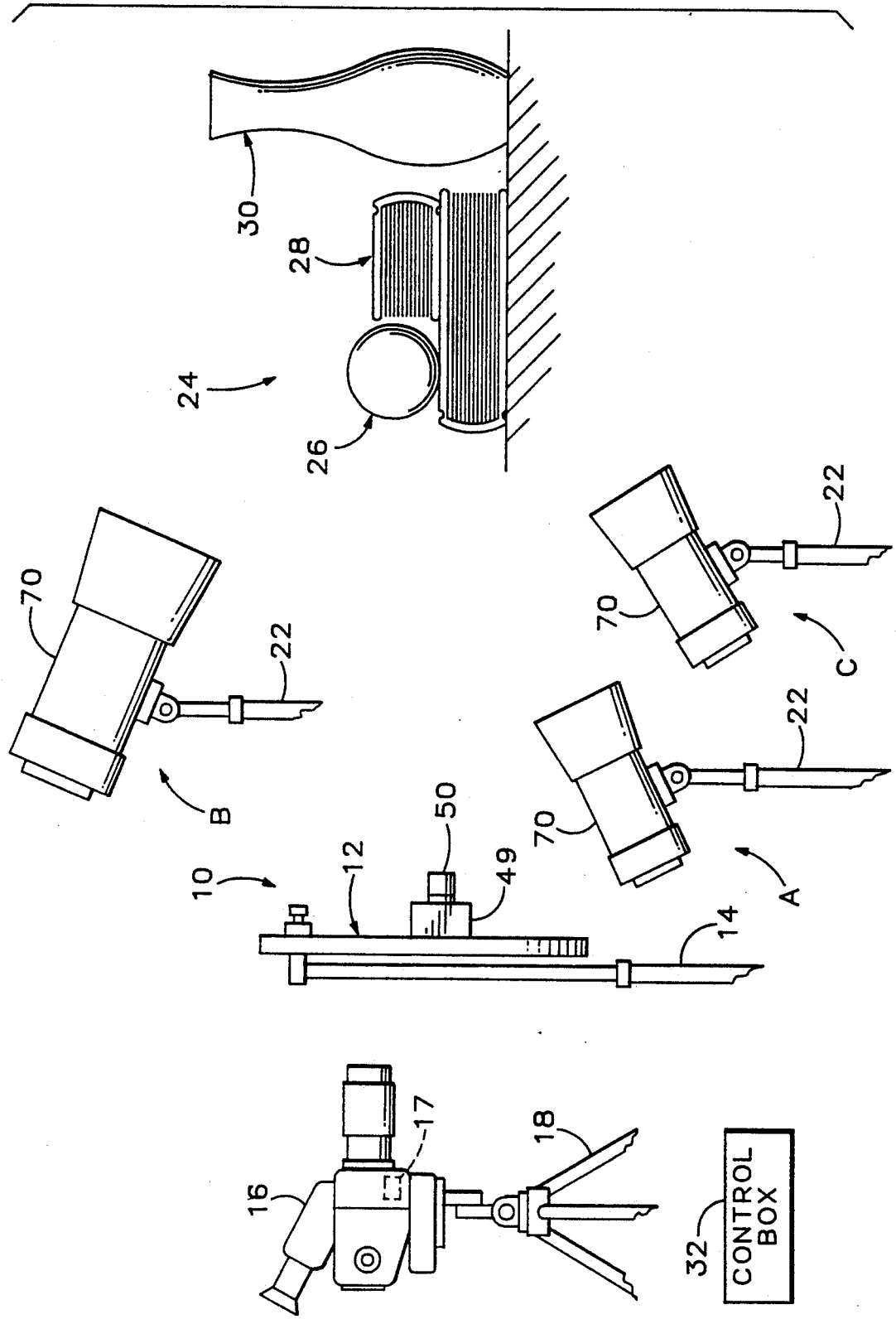
FIG. 1 is a perspective, environmental view of the synchronized filter mechanism of the invention.

Turning initially to FIG. 1, an environmental setting using the light synchronized filter mechanism, shown generally at 10, is depicted. Filter mechanism 10 includes a filter unit 12, which is supported on a stand 14. A camera 16 is also supported on a camera stand 18 and includes an internal flash synchronization mechanism 17. Cable and wire connections between the components have been eliminated for the sake of clarity, Plural light sources are provided. In the preferred embodiment, these light sources take the form of stroboscopic flash units, designated A, B and C, each of which includes a flash head 20 and a stand 22. Camera 16 is directed through filter unit 12 towards a subject area 24, which may include live subjects, but which, for ease of illustration, is depicted with still life subjects 26, 28 and 30.

Flash units, or strobes, A, B and C, filter unit 12 and camera 16 are all connected to control circuit 32 which in turn is connected to a power supply 34.

As depicted in FIG. 1, flash units A, B and C are directed towards different portions of subject area 24. Flash A is directed towards a ball, subject 26. Flash unit C is directed towards the books, subjects 28, while flash B is directed towards subject area 24 overall. Optical alignment, as used herein, means that filter unit 12 is positioned between camera 16 and subject area 24, and that the light from light sources A, B and C is reflected from the subject area through filter unit 12 to the camera, the light sources thereby illuminating the subject.

Filter unit 12, also referred to herein as a rotary filter, is configured to receive a number of filters therein, each of which has different optical properties. If it is the desire of the photographer to emphasize subject 26, flash unit A may be synchronized with a clear optical filter, flash unit C may be synchronized with a soft focus filter, and flash unit B may be synchronized with a neutral density, very soft focus, or other suitable filter. As the filters within filter unit 12 are presented to camera 16, and when the photographer is ready to take the photo, camera 16 is triggered, thereby setting off, in sequence, flash units A, B and C such that the desired filter is interposed between subject area 24 and camera 16 as the appropriate flash unit is triggered, thereby illuminating the light sources at predetermined times relative to the optical alignment of the filters in filter unit 12 and the light sources.

Referring now to FIGS. 2 and 3, filter unit 12 will be described in greater detail. Filter unit 12 includes a framework 36 which substantially encloses the periphery of a rotating disc 38. Frame 36 is also referred to herein as a filter housing. Disc 38, in the preferred embodiment, contains three segments, 38a, 38b and 38c, which carry filters 40, 42 and 44, respectively. The filters may be retained on disc 38 by means of double sided adhesive tape, or the disc may be formed in two sections which are joined to secure the filter media therebetween. Other suitable retainers may be used, so long as the retainers are capable of holding the filters on the disc at speed approaching 2000 rpm. Another embodiment of the disc is to provide a unitary acrylic disc which has been treated to produce disc segments having varying optical properties. The enclosure of disc 38 within frame 36 does provide a certain amount of aerodynamic stability to disc 38, and lessens, somewhat, the air flow over the disc.

Framework 36 includes an opening 46 therethrough which is aligned with camera 16 and subject area 24. Opening 46, also referred to herein as a filter housing port may be a simple cutout in framework 36, or it may be equipped with an auxiliary shutter as described in either of the above-identified U.S. Pat. Nos. 5,029,309 or 5,034,761.

Disc 38, also referred to herein as a rotary filter holder, is rotated within housing 36 by a drive mechanism, depicted generally at 48. The drive mechanism is operable to filter holder 38 at a predetermined speed, which, in the preferred embodiment, is approximately 1800 rpm. Drive mechanism 48 includes a housing 49, a drive motor 50 which has a drive shaft 52 extending from one end thereof. Drive shaft 52 carries a first gear or pulley 54 thereon, and also carries an optical disc 56. A drive belt 58 connects first pulley 54 to a second pulley or gear 60 which is carried on a filter holder shaft 62. Belt 58 is a timing belt to insure that the relative rotation of the first and second gears remain constant and that no slippage occurs. Filter holder shaft 62 passes through the center of rotary filter holder 38 and may be supported by a bearing 64, carried in filter housing 36 and a bearing 66 carried in drive mechanism housing 49. The size of first gear 54 and second gear 60, and the speed of drive motor 50 determine the rotational speed of disc 38. In the preferred embodiment, it is desired to have disc 38 spin at approximately 1800 rpm. Drive motor 50, in the preferred embodiment, operates on 24 volts DC at speeds up to 5000 rpm. The motor control circuit will be described later herein. Other embodiments of the drive mechanism may be provided which use only a motor, such as a DC brushless or pancake motor, which will carry disc 38 and encoder disc 56 directly thereon.

As previously noted, optical disc 56 is carried on motor drive shaft 52 in the preferred embodiment. The optical disc is part of a conventional optical encoder which includes, in this embodiment, three LED/sensor elements, indicated at 68, 70 and 72. The optical encoder, also referred to herein as a filter holder position sensor, is operable to sense the position of the filter holder relative to port 46 and camera 16. The sensors are mounted on a sensor platform 74 and include an LED located on one side of optical disc 56 and an optical sensor located on the other side thereof. To further explain the arrangement of the sensors and LED's, LED/sensor 68, 70 and 72 are associated with strobe or flash units A, B and C, respectively. As will be explained later herein, given proper preconditions, when opening 74 in disc 56 passes between LED 68a and sensor 68b, a light synchronization signal is generated by sensor 68b, strobe A will be triggered. Encoder disc 56 may be incorporated directly on filter holder 38, with an appropriate shift in the location of the LED/sensor elements.

Figure 5:
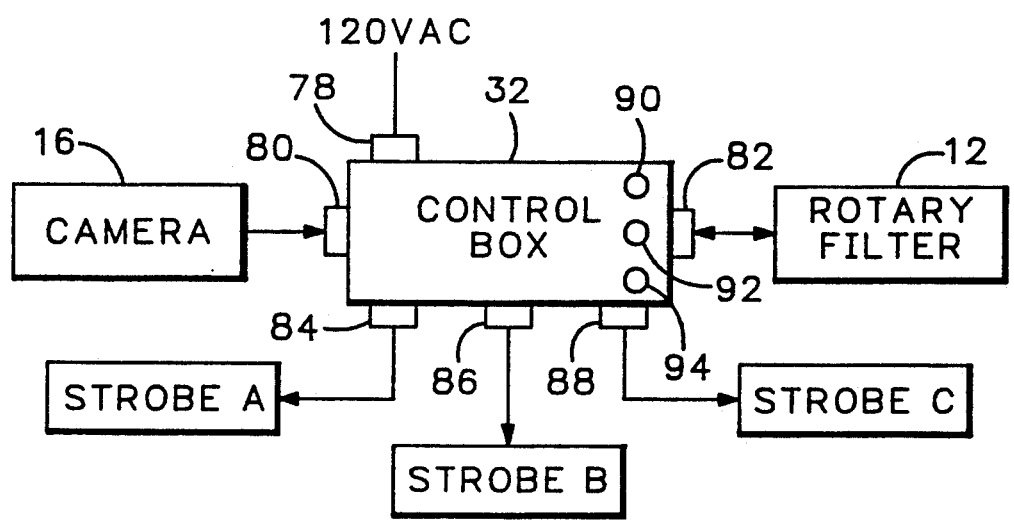
FIG. 5 is a schematic block diagram of the filter mechanism of the invention.

Referring now to FIG. 5, the connections to control box 32 are described in greater detail. Control box 32 has an external power supply 78, which in the preferred embodiment is 120 volts AC. Flash synchronizer 17 in camera 16 is connected to control box 32 through port 80. A port 82 receives the connection from filter unit 12, which in the preferred embodiment is a cable having multiple conductors therein. Ports 84, 86 and 88 are connected, respectively, to strobe A, strobe B and strobe C. It should be noted that the ports are of the phone jack or RCA connector type, or may be of any other suitable port for the electrical load which is placed on them. The use of the ports and cabling allows the filter mechanism to be rapidly connected and disconnected from a camera, strobe units and the filter unit.

Control box 32 also includes an off/on switch 90, a red warning light 92 and a green ready light 94. When all of the connections are made to control box 32, the filter mechanism may be turned on with on/off switch 90. This will result in the red warning light 92 being illuminated, indicating that a lockout mechanism is operative, thereby preventing the strobes from being fired. Light 92 will remain illuminated until disc 38 has reached its proper speed, at which time, light 92 will shut off and green light 94 will be illuminated.

Figure 6:
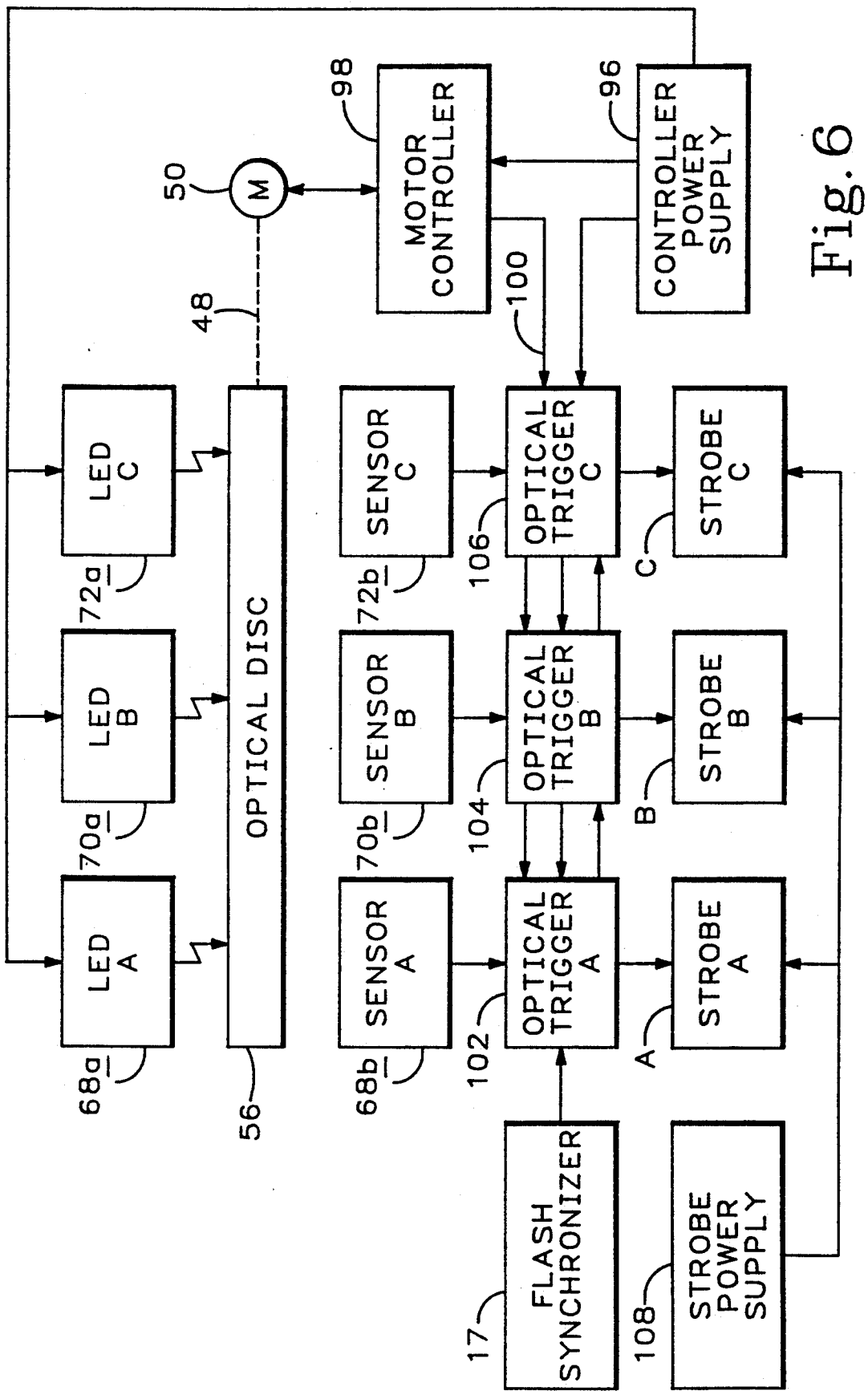
FIG. 6 is a block diagram of the control and drive mechanisms of the invention.

Referring now to FIG. 6, a control circuit is depicted in schematic form. The control circuit includes LED/sensor elements 68, 70 and 72, with, for instance, unit 68 being depicted as a LED 68a and a sensor 68b. A controller power supply 96 converts 120 volt AC power into the appropriate voltage and current for LED's 68a, 70a and 72a. Power supply 96 also provides power to a motor controller 98 which in turn provides power to motor 50. In the preferred embodiment, the control circuit includes a feedback mechanism in motor controller 98 which signals the motor controller when motor 50 has reached a predetermined speed. This predetermined speed is such that disc 38 rotates at approximately 1800 rpm. The predetermined speed of motor 50 will be determined by the size of gears 54 and 60. When motor controller 98 detects that motor 50 is at the predetermined speed, it provides a release signal 100 to optical triggers 102, 104 and 106, which comprise, along with the optical encoder, what is referred to herein as an optical triggering mechanism. Motor speed may also be determined from signals from any of the LED/sensor elements.

Controller power supply 98 provides power to the optical triggers only after the motor has reached it predetermined speed. This lockout mechanism prevents the strobes from being fired until the motor has reached its operating speed. Strobes A, B and C receive their power from a strobe power supply 108.

In operation, the light synchronized filter mechanism is initially equipped with the appropriate filters within disc 38. The filters may be of a theatrical gel-type or may be a plastic optical filters which are used with photographic equipment, such as those used with the COKIN ® system. The filters are positioned in disc 38 and held in place by retainers or double-sided adhesive tape, depending on the construction of disc 38. The filter unit, camera and strobes are arranged in relation to the subject area 24 with individual strobes being positioned to direct light towards a portion of the subject area. As previously noted, in this arrangement, electronic flash A is directed towards ball 26, electronic flash C is directed towards books 28 and electronic flash B is directed to the overall subject area. If desired, the strobes may be rearranged to direct light towards vase 30 as desired. It should also be noted at this point, that disc 38 may be constructed with as few as two filter receiving areas, and may be constructed with more than three filter holding areas, depending on the size of disc 38. The features of the optical encoder and the control circuit are easily modified to accommodate fewer or more than the three filters depicted in the preferred embodiment.

Once the subject area and the photographic equipment is arranged, the photographer is ready to take a photograph. In the scenario being described, it may be desireable to soften the focus on ball 26. This may be accomplished by providing a soft focus filter as filter 40. Filter 42 may be selected to have certain color balancing properties to change the overall warmth of the subjects, while filter 44, which will be in position when electronic flash C is triggered, may be selected to be a neutral density filter to de-emphasize the books in the subject area.

Prior to taking the actual photograph, the photographer will start the light synchronized filter mechanism by turning switch 90 to an on position. This will provide power to motor 50 which will accelerate, also accelerating disc 38 therewith. Initially, red light 92 will illuminate. Once motor 50 has reached its appropriate speed, green light 94 will illuminate, signaling that the mechanism is ready for operation. Power to the optical triggers is now provided by the controller power supply. Shutter speed of approximately 1/30th of a second or longer are used with the system in order to provide an open shutter while all three filter have an opportunity to rotate through port 46 and the control circuit fires the appropriate electronic flash units.

It should be noted that the system will not necessarily wait until filter 40 is in port 46 to begin the sequence of firing. For the sake of clarity, we will assume that the sequence is to fire strobe A, then strobe B, then strobe C. If, however, the flash synchronizer in the camera closes the circuit with optical triggers A, B and C at such a time as optical disc 56 has slot 76 between LED 70a and sensor 70b, a light synchronization signal will be generated by sensor 70b and, upon receipt of such signal, optical trigger 104 will be the first to fire, thereby firing strobe B. Sensor 72b will be the next sensor to receive a signal from its associated LED, and will fire optical trigger 106 and strobe C. Strobe A will then be fired in sequence.

It is thus possible for a photographer to provide a variety of optical characteristics for a given subject area in rapid sequence by filtering the light which is reaching the camera through the filters carried in filter unit 12.

Figure 7:
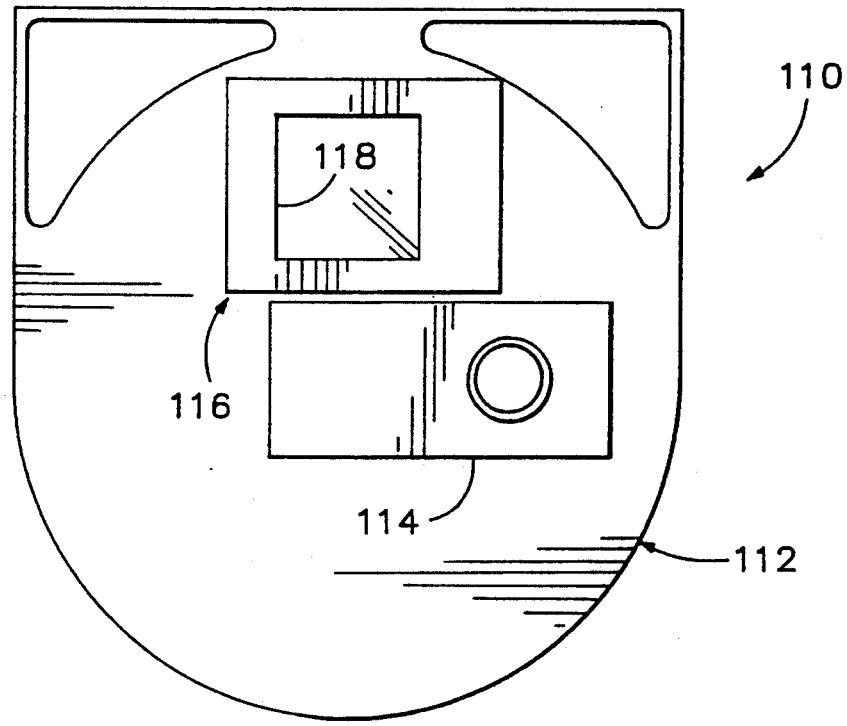
FIG. 7 is a front elevation of an alternate form of the invention.

Referring now to FIG. 7, a modified form of the light synchronized filter mechanism is depicted at 110. Filter mechanism 110 includes a filter unit 112, which is similar in construction to filter unit 12 previously described. Filter unit 112 includes a drive mechanism 114 for driving a filter disc contained within filter unit 112. An auxiliary shutter 116 is included with filter unit 112 to allow a photographer to completely block light going through an optically aligned filter and auxiliary shutter port 118. Features of auxiliary shutter 116 are described in my previously identified United States patents, and the operation and control of such auxiliary shutter units is fully disclosed in those patents, which are incorporated herein by reference.

Provision of an auxiliary shutter on the filter unit allows a photographer to combine the features of the light synchronized filter mechanism disclosed herein along with the capability of providing additional highlights on the subject area. As noted in my U.S. Pat. No. 5,034,761 for PHOTOGRAPHIC EXPOSURE CONTROL APPARATUS HAVING REMOTE FILTER HOLDER MECHANISM, in some instances, it is desireable to insert a filter between the subject and camera when highlighting various parts of the subject. The control system of the filter mechanism described herein may be easily modified, by means well-known to those of ordinary skill in the art, to provide a stepping arrangement of filters such that the photographer may select any of the filters contained in the filter holder to be positioned in line with port 118 and to operate auxiliary shutter 116 accordingly, thereby providing the photographer with a variety of filters which may be used in the course of a photographic session without the need to change filters during the course of that session.

Although a preferred embodiment of the invention, and a modified form thereof, have been disclosed herein, it should be appreciated that further variations and modifications may be made without departing from the scope of the invention as defined in the appended claims.

What I claim is:

1. A light synchronized filter mechanism for use with a camera having a flash synchronizer, a subject area and plural light sources comprising:
   a filter holder for holding plural filters in optical alignment with the camera and the plural light sources, said filter holder being located between the subject area and the camera;
   filters located in said filter holder; wherein said filters have various optical properties;
   a drive mechanism for driving said filter holder;
   a filter holder position sensor, including an optical encoder, for sensing the position of said filter holder relative to the camera; and
   a control circuit for controlling said drive mechanism to move said filter holder at a predetermined rate, and for illuminating a specific light source as a specific filter aligns with the subject area wherein said optical encoder generates a light synchronization signal for a said specific light source, and wherein said light synchronization signal is transmitted to said control circuit which activates said specific light source upon receipt of a light synchronization signal associated with said specific light source.

2. The mechanism of claim 1 wherein said control circuit includes an optical triggering mechanism for activating a light source.

3. The mechanism of claim 1 wherein said drive mechanism includes a drive motor having a drive shaft, a first drive gear carried on said drive shaft, and an optical encoder disc carried on said drive shaft, and which further includes a filter holder shaft which supports and drives said filter holder, which has a second drive gear carried thereon, wherein said first drive gear and said second drive gear are drivingly connected to one another by a drive belt.

4. The mechanism of claim 3 wherein said control circuit includes a feedback mechanism to control said drive motor at a predetermined speed, and which also includes a lockout mechanism which prevents operation of the filter mechanism when the motor is not operating at said predetermined speed.

5. A light synchronized filter mechanism for use with a camera, having a flash synchronizer, and plural light sources comprising:
   a filter housing having a port therethrough;
   a filter holder having a filter holder shaft therethrough, rotatably mounted in said filter housing for holding plural filters in optical alignment with said port and including an optical encoder;
   filters located in said filter holder, wherein said filters have various optical properties;
   a drive mechanism for rotating said filter holder to position said filters in alignment with said port;
   a filter holder position sensor for sensing the position of said filter holder relative to said port; and
   a control circuit for controlling said drive mechanism to rotate said filter holder at a predetermined rate, and for illuminating a specific light source at a predetermined time wherein said optical encoder generates a light synchronization signal for said specific light source, and wherein said light synchronization signal is transmitted to said control circuit for activating said specific light source upon receipt of a light synchronization signal associated with said specific light source, which predetermined time occurs when said specific filter is optically aligned with the camera and the subject.

6. The mechanism of claim 5 wherein said control circuit includes an optical triggering mechanism for activating a light source.

7. The mechanism of claim 5 wherein said drive mechanism includes a drive motor having a drive shaft, a first drive gear carried on said drive shaft, and an optical encoder disc carried on said drive shaft, and which further includes a second drive gear carried on said filter holder shaft, wherein said first drive gear and said second drive gear are drivingly connected to one another by a drive belt.

8. The mechanism of claim 7 wherein said control circuit includes a feedback mechanism to control said drive motor at a predetermined speed, and which also includes a lockout mechanism which prevents operation of the filter mechanism when the motor is not operating at said predetermined speed.

9. An auxiliary shutter for use with a camera, having a flash synchronizer, and plural light sources comprising:
   an auxiliary shutter mount having an auxiliary shutter port and a shutter therein;
   a remote control for said shutter;
   a filter housing having a filter housing port therethrough, wherein said filter housing port is optically aligned with said auxiliary shutter mount port;
   a filter holder rotatably mounted in said filter housing for holding plural filters in optical alignment with said filter housing port;
   filters located in said filter holder, wherein said filters have various optical properties;
   a drive mechanism for rotating said filter holder to position said filters in alignment with said filter housing port, said drive mechanism including a drive motor having a drive shaft, a first drive gear carried on said drive shaft, and an optical encoder disc carried on said drive shaft, and which further includes a filter holder shaft which supports and drives said filter holder, which has a second drive gear carried thereon, wherein said first drive gear and said second drive gear are drivingly connected to one another by a drive belt;
   a filter holder position sensor for sensing the position of said filter holder relative to said filter housing port; and
   a control circuit for controlling said drive mechanism to rotate said filter holder at a predetermined rate, and for illuminating a specific light source as a specific filter aligns with the subject, wherein said optical encoder generates a light synchronization signal for said specific light source, and wherein said light synchronization signal is transmitted to said control circuit which activates said specific light source upon receipt of a light synchronization signal associated with said specific light source.

10. The mechanism of claim 9 wherein said control circuit includes an optical triggering mechanism for activating a light source.

11. The mechanism of claim 9 wherein said control circuit includes a feedback mechanism to control said drive motor at a predetermined speed, and which also includes a lockout mechanism which prevents operation of the filter mechanism when the motor is not operating at said predetermined speed.

* * * * *